US009969133B2

(12) United States Patent
Hedges et al.

(10) Patent No.: US 9,969,133 B2
(45) Date of Patent: May 15, 2018

(54) RAIL APPARATUS FOR WIND TURBINE BLADE CONSTRUCTION

(71) Applicant: Vestas Wind Systems A/S, Aarhus N. (DK)

(72) Inventors: Andrew Hedges, London (GB); Byungwoo Lee, Cupertino, CA (US)

(73) Assignee: Vestas Wind Systems A/S, Aarhus N. (DK)

( * ) Notice: Subject to any disclaimer, the term of this patent is extended or adjusted under 35 U.S.C. 154(b) by 280 days.

(21) Appl. No.: 14/654,087

(22) PCT Filed: Dec. 19, 2013

(86) PCT No.: PCT/DK2013/050444
§ 371 (c)(1),
(2) Date: Jun. 19, 2015

(87) PCT Pub. No.: WO2014/094789
PCT Pub. Date: Jun. 26, 2014

(65) Prior Publication Data
US 2015/0298403 A1    Oct. 22, 2015

Related U.S. Application Data

(60) Provisional application No. 61/740,646, filed on Dec. 21, 2012.

(30) Foreign Application Priority Data

Jan. 21, 2013  (DK) ................................ 2013 70030

(51) Int. Cl.
B29C 70/38    (2006.01)
B29C 70/34    (2006.01)
(Continued)

(52) U.S. Cl.
CPC .......... B29C 70/541 (2013.01); B29C 31/085 (2013.01); B29C 70/34 (2013.01);
(Continued)

(58) Field of Classification Search
None
See application file for complete search history.

(56) References Cited

U.S. PATENT DOCUMENTS 4,133,711 A       1/1979   August et al.
2004/0026025 A1   2/2004   Sana et al.
(Continued)

FOREIGN PATENT DOCUMENTS

EP        2067611 A1       6/2009
EP        2226186 A1       9/2010
WO        20100129492 A2   11/2010

OTHER PUBLICATIONS

Danish Patent and Trademark Office, Search Report issued in Application No. 2013 70030 dated Sep. 20, 2013.
(Continued)

Primary Examiner — Barbara J Musser
(74) Attorney, Agent, or Firm — Wood Herron & Evans LLP

(57) ABSTRACT

An apparatus for positioning sheets of material in a wind turbine blade mold to form a shell of a wind turbine blade, the mold having a mold surface defining the profile of a portion of the shell, the apparatus comprising: a rail that, in use, is mounted proximate to the mold and follows a path in a direction along the longitudinal length of the mold; and a sheet mounting apparatus coupled to the rail, the mounting apparatus configured to releasably hold a sheet of material and to move along the rail.

21 Claims, 12 Drawing Sheets

(51) Int. Cl.
  *B29C 70/54* (2006.01)
  *B29C 31/08* (2006.01)
  *B66C 19/00* (2006.01)
  B29L 31/08 (2006.01)

(52) U.S. Cl.
  CPC .............. *B29C 70/38* (2013.01); *B66C 19/00* (2013.01); *B29L 2031/085* (2013.01); *Y02P 70/523* (2015.11)

(56) References Cited

U.S. PATENT DOCUMENTS

| | | | |
|---|---|---|---|
| 2009/0148647 A1* | 6/2009 | Jones | B29C 70/30 |
| | | | 428/58 |
| 2015/0217488 A1* | 8/2015 | Allman | B29C 70/48 |
| | | | 264/152 |
| 2015/0314583 A1* | 11/2015 | Jess | B29C 31/085 |
| | | | 156/324.4 |

OTHER PUBLICATIONS

European Patent Office, International Search Report and Written Opinion issued in International Application No. PCT/DK2013/050444 dated May 20, 2014.

* cited by examiner

RAIL APPARATUS FOR WIND TURBINE BLADE CONSTRUCTION

FIELD OF THE INVENTION

The present invention relates to rotor blades for wind turbines and to an apparatus that conveys materials using one or more rails during the construction of such blades.

BACKGROUND

A typical horizontal axis wind turbine is illustrated in FIG. 1. The wind turbine 1 comprises a tower 2, a nacelle 3 mounted on top of the tower 2 and a rotor 4 operatively coupled to a generator 5 within the nacelle 3. The wind turbine 1 converts kinetic energy of the wind into electrical energy. In addition to the generator 5, the nacelle 3 may house the various components required to convert the wind energy into electrical energy and also the various components required to operate and optimize the performance of the wind turbine 1. The tower 2 supports the load presented by the nacelle 3, the rotor 4 and other wind turbine components within the nacelle 3.

The rotor 4 includes a central hub 6 and three elongate rotor blades 7a, 7b, 7c of approximately planar configuration that extend radially outward from the central hub 6. In operation, the blades 7a, 7b, 7c are configured to interact with the passing air flow to produce lift that causes the central hub 6 to rotate about its longitudinal axis. Wind exceeding a minimum level will activate the rotor 4 and allow it to rotate within a plane substantially perpendicular to the direction of the wind. The rotation is converted to electric power by the generator 5 and is usually supplied to the utility grid.

The turbine blades have a root section at which it connects to the central hub. The root section is generally circular in cross section and for blades which are 80 m or more in length can be as much as 4 or 5 meters in diameter. At the opposite end of the blade to the root is the blade tip. The direction along the blade between the root and the blade tip is known as the span-wise direction. In the lateral direction, known as the chord-wise direction, the blade extends between a leading edge and a trailing edge.

FIG. 2 shows an example rotor blade construction, with the exploded perspective view in FIG. 2 showing the elements used in the construction of such a rotor blade. The rotor blade is formed from two half shells 202 and 206 which each comprise elongate reinforcing structures 204. The two reinforcing structures that extend substantially along the full length of the turbine blade from the root section to the blade tip are referred to as spar caps. The complete turbine blade is formed from the two half shells 202 and 206 and two shear web 205 placed in between. The shear webs 205 are used to couple together the spar caps in order to transfer shear forces.

Wind turbine blades, including the example shown in FIG. 2, are typically made out of fibre-reinforced plastics (FRP), and particularly glass-reinforced plastics (GRP), which may be formed as dry sheets and positioned into a mould to form the various layers of the blade shell. In order to reinforce the blade, a fibre with a higher strength factor or an increased number of layers of FRP may be used in particular locations that experience higher forces during operation. Using a higher strength fibre is often a more expensive option, and so it may be desirable to instead reinforce the blade structure with an increased thickness of FRP, particularly in the root section of the blade where the bending moment is at its maximum.

Increasing the number of layers of FRP increases the amount of time it takes to lay each of the individual FRP sheets into the mould. Each sheet of FRP must be carefully laid into the mould ensuring that there are no formation defects, such as bends, kinks or creases, in the sheets. Any bends, kinks or creases in the sheets of FRP will lead to a concentration of stress and will therefore reduce the strength of the fibre.

Using different material specifically for the blade root section also has its own problems because the sheets still need to be installed quickly and require the selection of the correct material along with accurate placement.

Existing methods of transporting sheet materials into position within a blade mould are not ideally suited for large scale manufacture. For example, the use of cranes to pick up and lift into place one or more sheets of material is not ideal because it is difficult to accurately position sheets with a crane. In addition, cranes can only be used to carry and position one sheet or stack of sheets at a time and are slow moving.

Thus, it is desirable to provide a method of manufacturing a wind turbine blade, using a mould, which reduces the amount of time required to install sheets of material, such as FRP, into the required position within the mould.

SUMMARY OF THE INVENTION

The invention is defined in the independent claims, to which reference is now directed.

Preferred features are set out in the dependent claims.

In accordance with a first aspect of the invention there is provided an apparatus for positioning sheets of material in a wind turbine blade mould to form a shell of a wind turbine blade. The mould has a mould surface defining the profile of a portion of the shell. The apparatus comprises a rail that, in use, is mounted proximate to the mould and follows a path in a direction along the longitudinal length of the mould. The apparatus further comprises a sheet mounting apparatus coupled to the rail, the mounting apparatus configured to releasably hold a sheet of material and to move along the rail.

By mounting the rails over the blade mould they can be held proximate to the blade mould such that the sheets can be positioned more quickly and with greater accuracy. The proximity of the rail to the mould may be such that a sheet of material mounted on the rail may at least partially pass through the channel defined by the mould as it moves along the rail. Proximity to the blade mould may also be achieved by arranging the rail to be supported, at least in part, by the wind turbine blade mould or by a structure adjacent to the blade mould.

One or more further sheet mounting apparatus may be coupled to the rail to allow more than one sheet to be moved along the rail at one time. This allows multiple sheets to be transported at once, or for sheets to be transported whilst another sheet is being positioned within the mould.

The mould preferably includes a mould root section corresponding to a root section of the wind turbine blade, the rail, in use, passing over the mould root section. This allows sheets of material to be incorporated into the root section of the blade easily, and is useful because it is the root section that may require the most layers of material for structural reinforcement.

The sheet mounting apparatus may comprise a carriage, such as rollers or runners, that engage with the rail to allow the mounting apparatus to move along the rail. One or more clamps may be connected to the carriage, for holding a sheet along at least one side.

First and second clamps may be provided, the clamps each configured to hold a sheet at opposing ends, and the locations of the couplings between the support and the clamps being such that a sheet, in use, is held in a slack state. Holding the sheet in a slack state enables the sheet to form a curve that conforms approximately to the curvature of the mould in the location at which the sheet is to be attached. The support may further include one or more cross bars that are releasably coupled, at or near either end, to the first and second clamps, the apparatus further comprising a releasable restraining mechanism for preventing the first and second clamps from moving relative to the cross bars. The releasable restraining mechanism may preferably be one or more pins passing through the cross bars.

The apparatus may comprise first and second rails, the rails, in use, being mounted proximate to the mould and following a path in a direction along the longitudinal length of the mould. Furthermore, first and second sheet mounting apparatus may be provided, these being coupled respectively to the first and second rails, the mounting apparatus configured to releasably hold a sheet of material and to move along the rail. The first and second mounting apparatus might optionally be configured to hold first and second sheets respectively, each sheet having a length such that, when laid in the wind turbine blade mould the sheet extends along the mould surface of the blade mould from either the trailing or leading edge to an intermediate point on the mould surface between the trailing and leading edge. This allows shorter sheets to be moved into position on opposite sides of the mould. Alternatively, the first and second mounting apparatus may be configured to hold a single sheet in use, the sheet having a length such that, when laid at the desired position in the wind turbine blade mould, it extends along the mould surface of the blade mould substantially from the trailing edge to the leading edge. This allows a sheet to be installed from a flat orientation into the desired position in the mould.

Where first and second rails are used they are preferably separated, in use, along the blade chord direction as defined by the mould. In some examples, the separation may vary along the length of the rails. In particular, the first rail may follow a path, over a portion of its length, substantially equidistant from the leading edge of the blade as defined by the mould. In addition, or alternatively, the second rail may follow a path, over a portion of its length, substantially equidistant from the trailing edge of the blade as defined by the mould. The separation between the first and second rails in the region of the mould in which the sheet is to be placed may be configured such that the sheet, in use, is held in a slack state having a curvature corresponding approximately to the curvature of the mould at that location.

The apparatus may further comprise one or more sheet dismounting assemblies that are located at one or more positions along the rail. Preferably the dismounting assemblies each include a guide that defines a path for guiding the sheet from the mounting apparatus to a desired position on the mould for subsequent attachment thereto. The guide is preferably coupled to the mould to allow accurate placement of the sheets in the desired locations. Preferably the guides each include a rib that extends from a position proximate to the rail to a position on the mould. In use, a sheet can be decoupled from the sheet mounting apparatus and coupled to one or more of these ribs.

The sheet mounting apparatus or the dismounting assembly may optionally further comprise a bridging member moveable from a first position, in which the path defined by the guide is separated from the sheet mounting apparatus, to a second position in which the path defined by the guide is coupled to the sheet mounting apparatus allowing the sheet to pass along the path to the desired position. The sheet mounting apparatus may optionally further include guiding mechanisms, such as rollers or runners, to which the sheet is coupled in use. The guiding mechanisms are restricted from movement when the bridging member is in the first position, and are able to engage with a guide when the bridging member is in the second position so as to move along the path to the desired position on the shell. In particular, the guiding mechanism may be restricted from movement by the bridging member when in the first position.

The ribs mentioned above may be used to support the rails on the mould. Preferably a support arm connects each rib to a rail, the support arm being offset from the guiding path to allow the guiding mechanism to pass along the paths defined by the ribs.

The path followed by the rails preferably begins, in use, at a storage location containing a plurality of sheets of material to be positioned in the shell, this being the location where the sheets of material are attached to the mounting apparatus. Where multiple rails are used, the separation between rails at the storage area may be approximately the same as the width of a sheet to be positioned in the blade shell, the sheets being mounted on the mounting apparatus in a flat orientation. The separation between the rails may reduce along the path of the rails such that when a sheet is in the desired mounting position it is slack and has a curvature approximately following the curvature of the blade shell at the desired mounting position.

The rail or rails may be mounted, at one end, on a moveable support allowing the rail or rails to be positioned by moving the support. The support then preferably comprises a base mounted on wheels or casters.

A second aspect of the invention provides a method of positioning sheets of material for use in the manufacture of a wind turbine blade. The method involves providing an apparatus of the sort described herein and positioning said apparatus such that the one or more rails are mounted proximate to a wind turbine blade mould and follow a path in a direction along the longitudinal length of the mould. A sheet of material is then mounted on the mounting apparatus at a first location and moved along the rail or rails to a second position in relation to a portion of the shell of a wind turbine blade located in the wind turbine blade mould. The sheet is then decoupled from the rail at the second location and attached to the mould. The method may further comprise mounting a second sheet of material on a second mounting apparatus at the first location whilst the first sheet of material is still mounted on the apparatus.

The sheets of material may be any suitable material to be used in the construction of a turbine blade, including plies of glass fibre material, or a stack of plies of glass fibre material.

BRIEF DESCRIPTION OF THE DRAWINGS

Embodiments of the invention will now be described in more detail, by way of example only, and with reference to the following drawings in which:

FIG. 3b is a view of a sheet mounting apparatus found in the apparatus of FIG. 3a;

DETAILED DESCRIPTION OF A PREFERRED EMBODIMENT

Preferred embodiments of the invention will now be described in relation to a turbine blade that is formed by positioning sheets of material within a mould.

Figure 1:
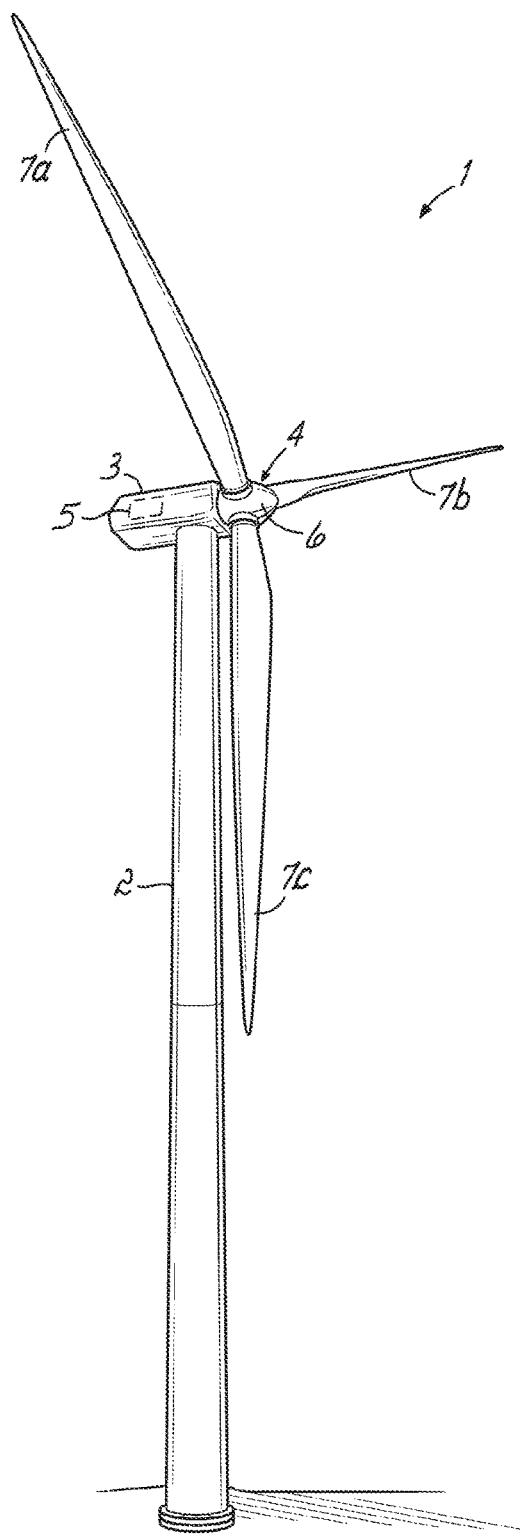
FIG. 1 illustrates the main structural components of a wind turbine.
Figure 2:
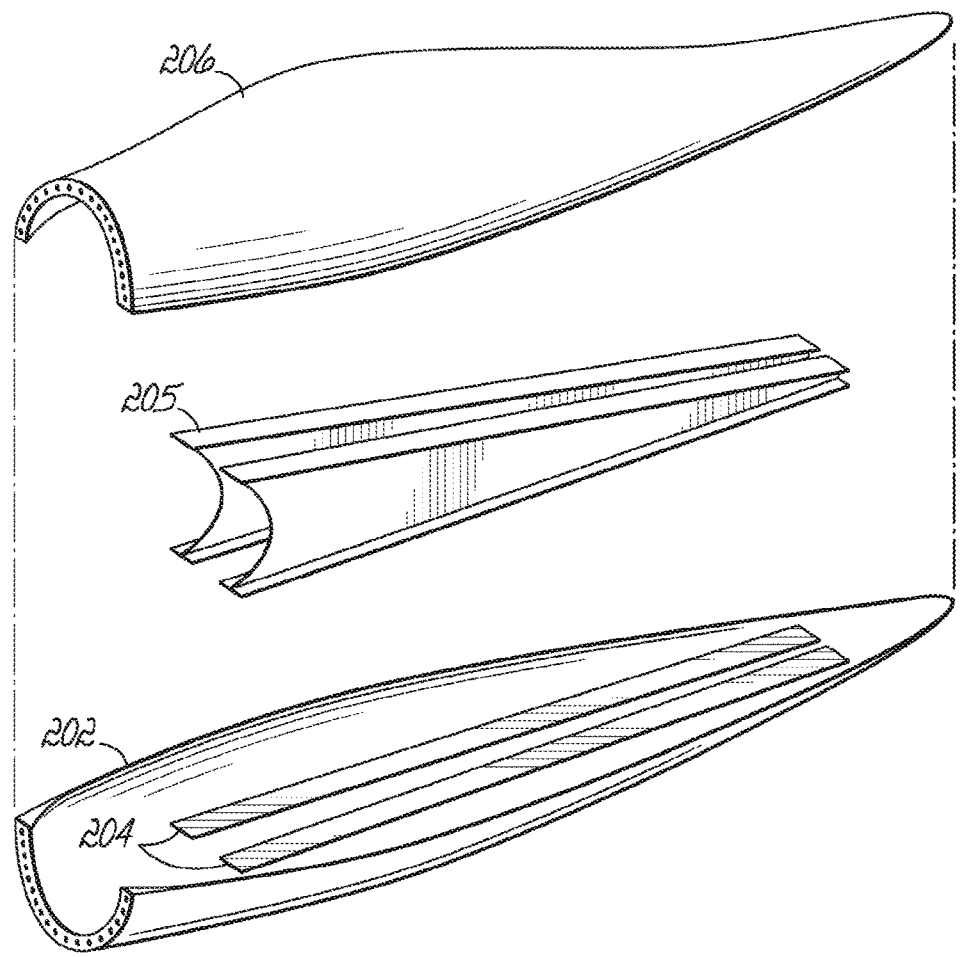
FIG. 2 is an exploded perspective view of an example of the elements used in a wind turbine blade.
Figure 3A:
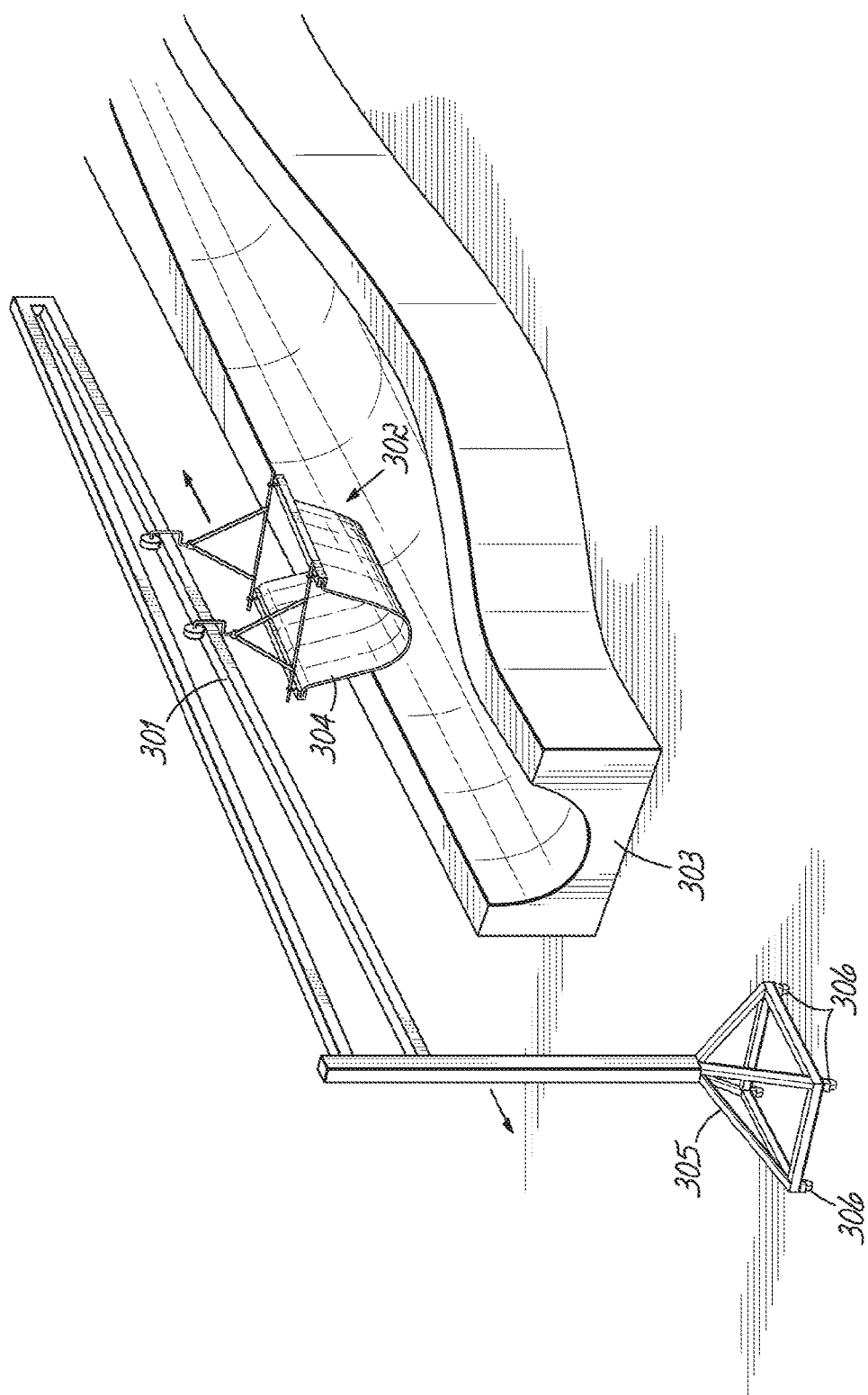
FIG. 3a is a view of a sheet positioning apparatus positioned over a mould.

FIG. 3a shows a sheet positioning apparatus according to an example of the invention. The apparatus generally comprises a rail 301 that is mounted proximate to the mould 303 of a wind turbine blade. The rail follows a path in a direction along the longitudinal length of the mould, which corresponds to the spanwise direction of the finished blade. A sheet mounting apparatus 302 is also provided, which is coupled to the rail and configured to releasably hold a sheet of material 304, and to move along the rail.

In the example of FIG. 3a, the rail 301 follows a straight path that extends over the turbine blade mould in use. In use, a sheet of material is mounted on the rail by being held by the sheet mounting apparatus 302, and is then moved along the rail into the appropriate position over the mould before being detached from the rail and mounted within the mould to form a wind turbine blade shell.

As can be seen in FIG. 3a, the sheet positioning apparatus may include a base 305 to which the rail 301 is attached. The base provides a balancing load to prevent the rail from toppling over, and may include additional weighting mass specifically to avoid this. The base may comprise means 306 for moving the base, such as castors or wheels, to allow the entire apparatus to be moved into a desired position relative to the wind turbine blade mould. Preferably the moving means 306 can be locked to prevent unwanted movement of the apparatus during operation.

Figure 3B:
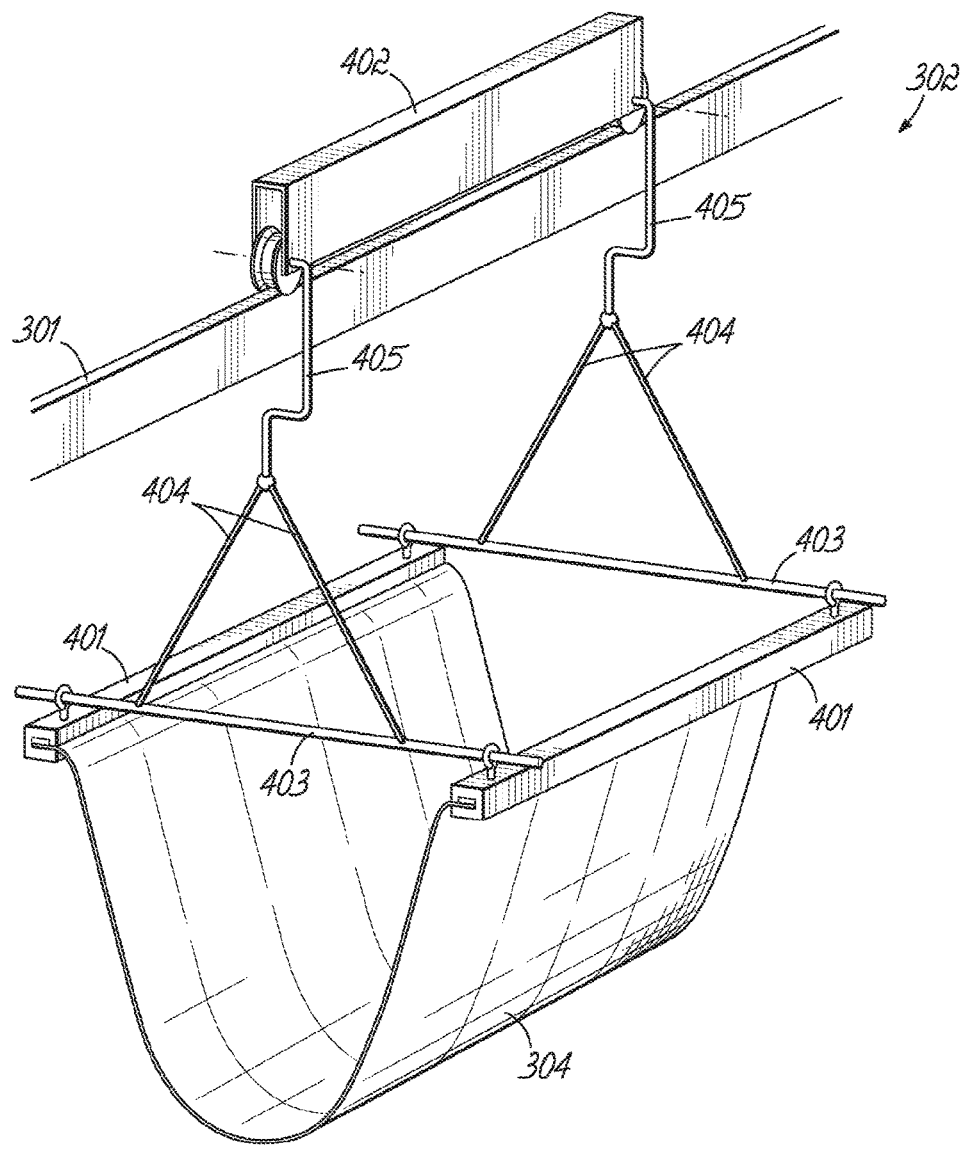

FIG. 3b shows the sheet mounting apparatus 302 in additional detail. In general terms the sheet mounting apparatus 302 comprises a carriage 402 which moves along the rail 301 in a spanwise direction and clamps 401 which releasably hold the sheet 304 at either end. The clamps 401 in this example are suspended from the carriage 402.

In the example of FIG. 3a the carriage comprises two sets of rollers which engage with the rail to ensure that they follow the rail and do not fall off. It will be appreciated that other forms of carriage may be used instead, such as a carriage with sliders or runners.

The clamps 401 are coupled to the carriage 402, such that the sheet 304 is suspended from the carriage 402. In this example, the rollers of the carriage 402 each have an offset support arm 405 that allows the rollers to move along the rail without interfering in the movement of the sheet mounting apparatus 302.

The sheet of material 304 is held in position, in use, by clamps 401 that releasably hold the sheet at either end. The sheet being held between the clamps 401 may have a length such that, when laid at the desired position in the wind turbine blade mould 303, it extends along the mould surface of the blade mould substantially from the trailing edge to the leading edge, being what will be referred to as a "full chord" sheet. Preferably the clamps 401 each extend along at least a portion of opposing edges of the sheet, and particularly they may extend along substantially the entire length of the edge so as to apply a clamping force along the entire length of the clamped edge. The clamps 401 are held by a support that couples to carriage 402 for allowing the sheet mounting apparatus to move along the rail.

In this example the sheet mounting apparatus 302 also comprises two cross bars 403 that are generally arranged substantially perpendicular to the path of the rail 301. The cross bars 403 support the clamps 401, and are connected to the carriage 402 by support members 404 which may be in the form of one or more wires. The wires 404 couple the cross bars to the carriage 402 and attach to a given cross bar at two spaced apart positions. The cross bar 403, or the clamps 401, may further include releasable restraining mechanism for preventing the clamps from moving relative to the cross bars A sheet of material is loaded onto the sheet mounting apparatus 302 at a first position along the rail, which may be a storage location for a plurality of sheets. The material is then moved into the desired position along the rail in relation to the wind turbine blade mould 303. When the desired position is reached, the sheet of material can be removed from the rail by removing the clamping bars from the cross bars. The clamping bars may then be removed and the sheet can be accurately positioned on the mould to form a portion of a wind turbine blade shell.

Figure 4:
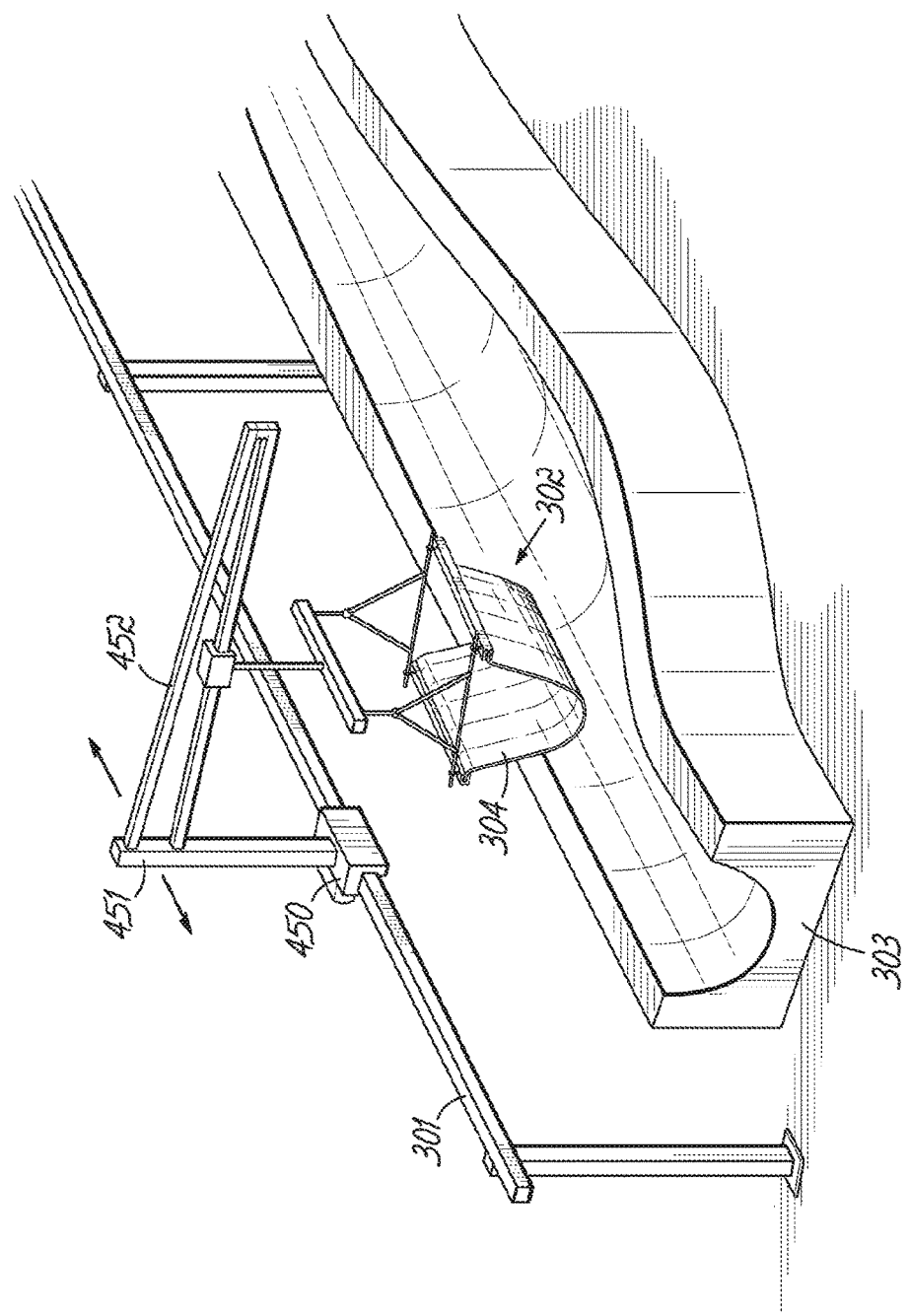
FIG. 4 is a view of a sheet positioning apparatus positioned over a mould.

FIG. 4 shows another example similar to that of FIG. 3a. In FIG. 4 the rail 301 follows a path adjacent to the mould 303. A carriage 450 moves along the rail 301 in the spanwise direction of the mould. The carriage 450 comprises a beam 451 extending vertically from the carriage 450. At the top of the beam is a boom 452 that extends horizontally and in a substantially chordwise direction over the mould 303. Clamps 401, and thus the sheet 304 are suspended from the boom 452 as is shown in FIG. 4.

Figure 5A:
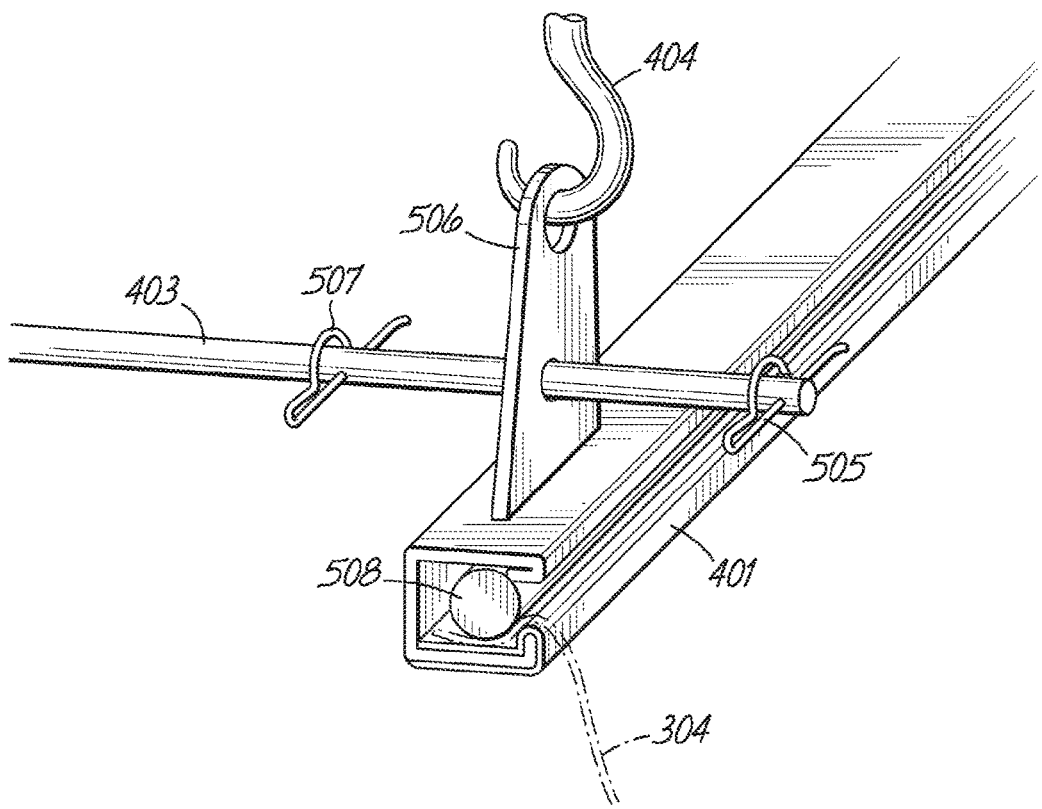
FIG. 5a is a view of a releasable restraining mechanism that may be used in the sheet mounting apparatus of FIG. 3b.

FIG. 5a provides an example of a releasable restraining mechanism that may be used to prevent movement of a clamp 401 relative to a cross bar 403. At least a first restraining mechanism 505 is provided. In this example the restraining mechanism may be in the form of a removable pin that can be inserted into the cross bar 403 to prevent the clamp engagement structure 506 from moving past it. The pin 505 may preferably be located substantially at the end of the cross bar to prevent the clamp from falling off the end of the bar. In addition, a further restraining mechanism 507 can be provided, for example in the form of a second removable pin, to prevent the clamp engagement structure from moving too far along the cross bar in the opposite direction. An inflatable tube 508 retains the sheet 304 in the clamp 401.

It is possible for the sheet mounting apparatus 302 to comprise only a single clamp 401 that is coupled the carriage, such that a sheet can be moved without having to clamp two edges. However, it is preferred that two clamps, clamping two opposing edges, are used so that the sheet of material can be held in a slack state when mounted on the rail. Keeping the sheet in a slack state introduces a curve to the sheet extending between the two clamps. This curve compliments the curve of the wind turbine blade mould, allowing easier positioning of the sheet of material, as the curve in the sheet can be matched approximately to the curve in the blade mould at the desired location in which the sheet of material is to be mounted. Matching the curve can be achieved by controlling the separation between the two clamps on the cross bars, with a smaller separation introducing a greater amount of curvature. Such an arrangement can be achieved, for example, by having a plurality of locations along each cross bar for receiving the removable pins.

An advantage of such an example is that multiple sheets of material can be mounted on a single rail by coupling multiple sheet mounting apparatuses to the rail. In this manner, whilst a first sheet is being moved along the rail into position, or is being moved from the rail into position on the mould, an additional sheet can be mounted at the other end and subsequently moved into position. This reduces the time it takes to get the sheets of material into the proper location on the mould during blade assembly.

Figure 5B:
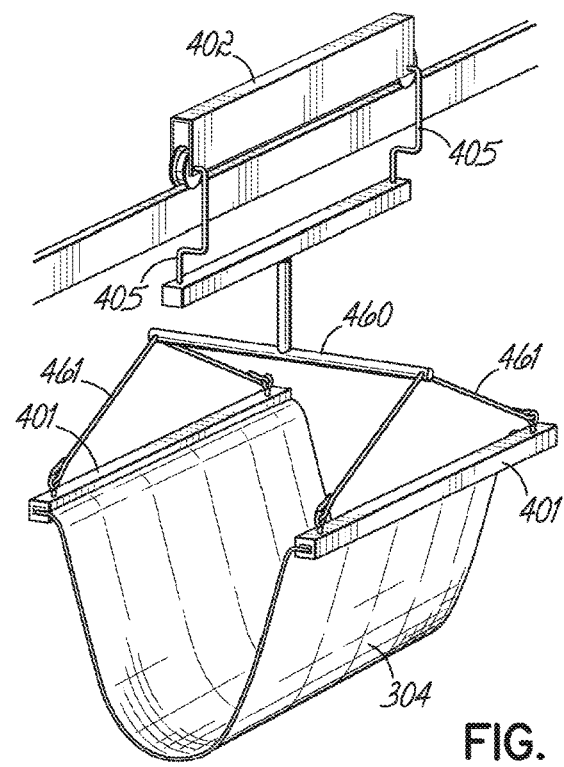
FIGS. 5b and 5c are further views of a sheet mounting apparatus found in the apparatus of FIG. 3a or 4.
Figure 5C:
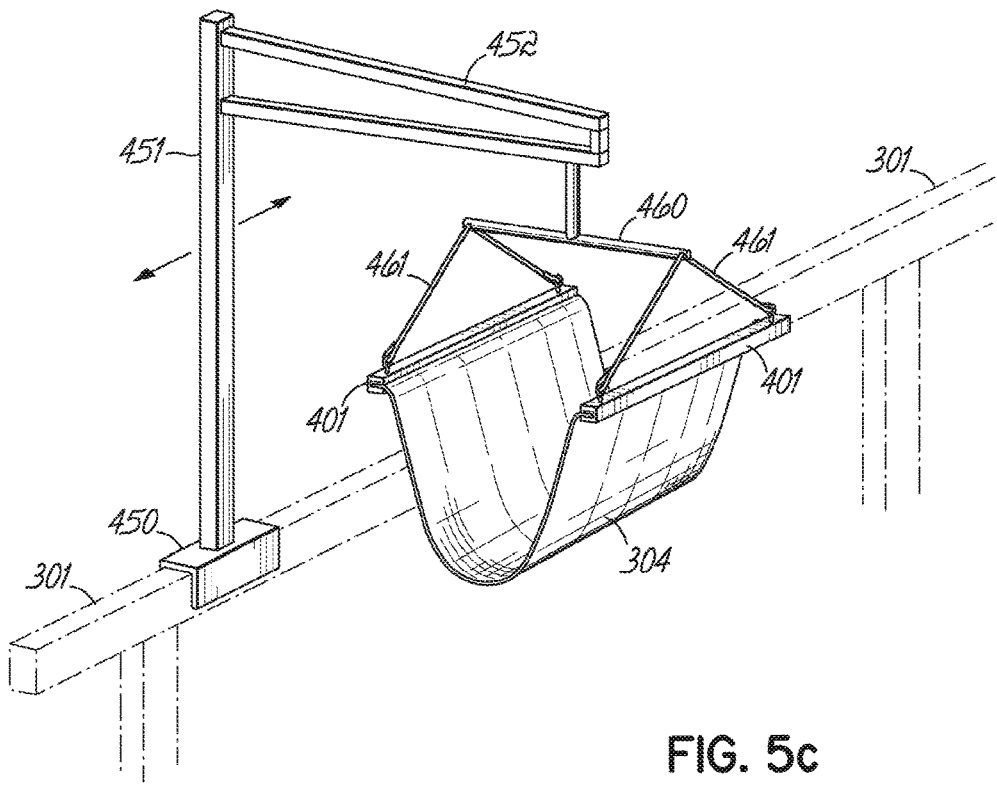

FIGS. 5b and 5c show different examples of how the sheet mounting apparatus 302 may be arranged. FIG. 5b shows the rail/carriage arrangement of FIG. 3a and FIG. 5c shows the rail/carriage arrangement of FIG. 4. In FIGS. 5b and 5c, the sheet mounting apparatus 302 does not include the cross bars 403. Instead, the clamps 401 are directly suspended from a lifting boom 460 via wires 461.

Whilst the example shown in FIGS. 3 to 5 provides a straightforward solution that allows quick transport of a sheet from a storage region to the vicinity of the mould onto which the sheet is to be placed, it may be preferred to include guiding means for more accurately positioning the sheets of material in the desired position on the mould.

Figure 8:
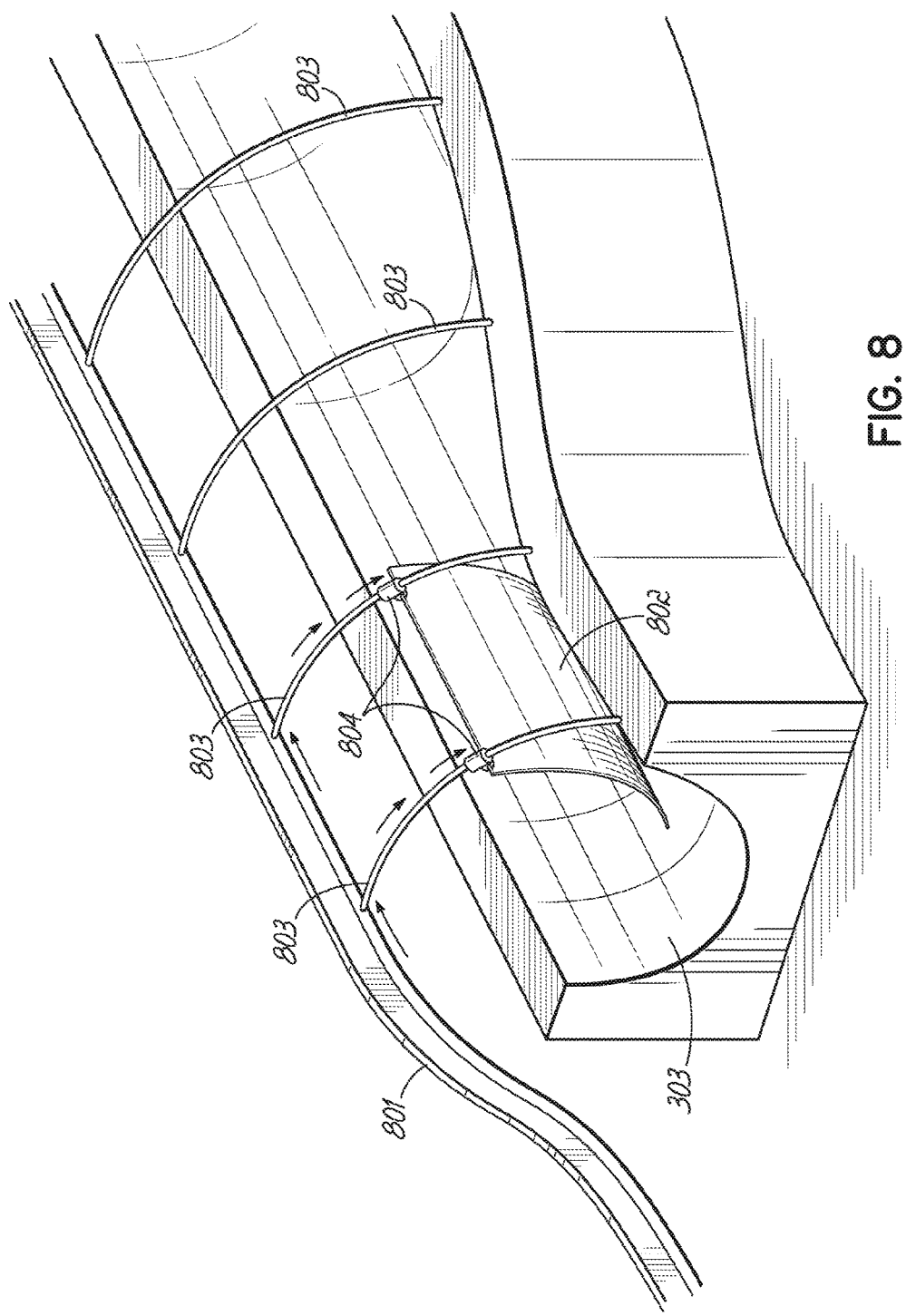
FIG. 8 is a perspective view of a sheet positioning apparatus positioned over a mould, including sheet guiding mechanism and a single rail.

FIG. 8 shows an example that incorporates a sheet dismounting assembly having guides in the form of ribs. The example of FIG. 8 is preferably used to transport a sheet that is held by the sheet mounting apparatus along only one side of the sheet. In such an example, preferably the sheet has a length such that, when laid in the wind turbine blade mould the sheet extends along the mould surface of the blade mould from either the trailing or leading edge to an intermediate point on the mould surface between the trailing and leading edge. This will be referred to as a "half chord" sheet.

In the example of FIG. 8 a single rail 801 is provided along which a mounted sheet 802 can move. The rail is mounted proximate to a mould 303 of a blade, and the rail follows a path in a direction along the longitudinal length of the mould as with the example of FIG. 3a.

Positioned along at least a portion of the length of the mould are a plurality of guides in the form of ribs 803 that extend from the rail 801 to the mould 303, with the rail acting as a spine to which the ribs may be attached. The ribs 803 serve to guide the sheet 802 from its position on the rail to the final position on the mould. A sheet may be moved along the rail until it aligns with one or more ribs 803 that correspond to the desired position for the sheet. The ribs are then used to engage with the sheet 802 and provide a path that allows the sheet to be guided from a position coupled to the rail 801 to the final position on the mould 303. The sheet may couple to the ribs by using a structure or component that follows the path of the ribs and will be referred to as guiding mechanism 804.

The sheet 802 may be coupled to the rail 801 in the orientation shown in FIG. 8, whereby an edge of the sheet extends in the direction of the length of the rail. The sheet 802 may be coupled directly to the carriage that allows a mounted sheet to move along the rail 801. The carriage used to move along the rail 801 may be the same component as the guiding mechanism 804, such that when the sheet reaches a position in which it is aligned with the desired ribs 803, the carriage is moved or redirected from the rail 801 to the ribs 803 as shown by the arrows in the figure. The carriage may simply be a gliding body, such as a hook, glider or runner, with the body being capable of being detached or transferred from the rail to the ribs.

Whilst the example of FIG. 8 could be used for full chord sheets, it is preferably used for half chord sheets and, as such, a corresponding set of ribs may be provided on the opposite side of the rail for positioning sheets on the other side of the mould. carriage may then be moved or redirected from the rail 801 to the ribs 803 on either side as required, allowing one rail to be used to mount sheets on both sides of the mould. Alternatively, a second rail could be provided that essentially mirrors the rail 801, with corresponding ribs on the opposite side.

Figure 6:
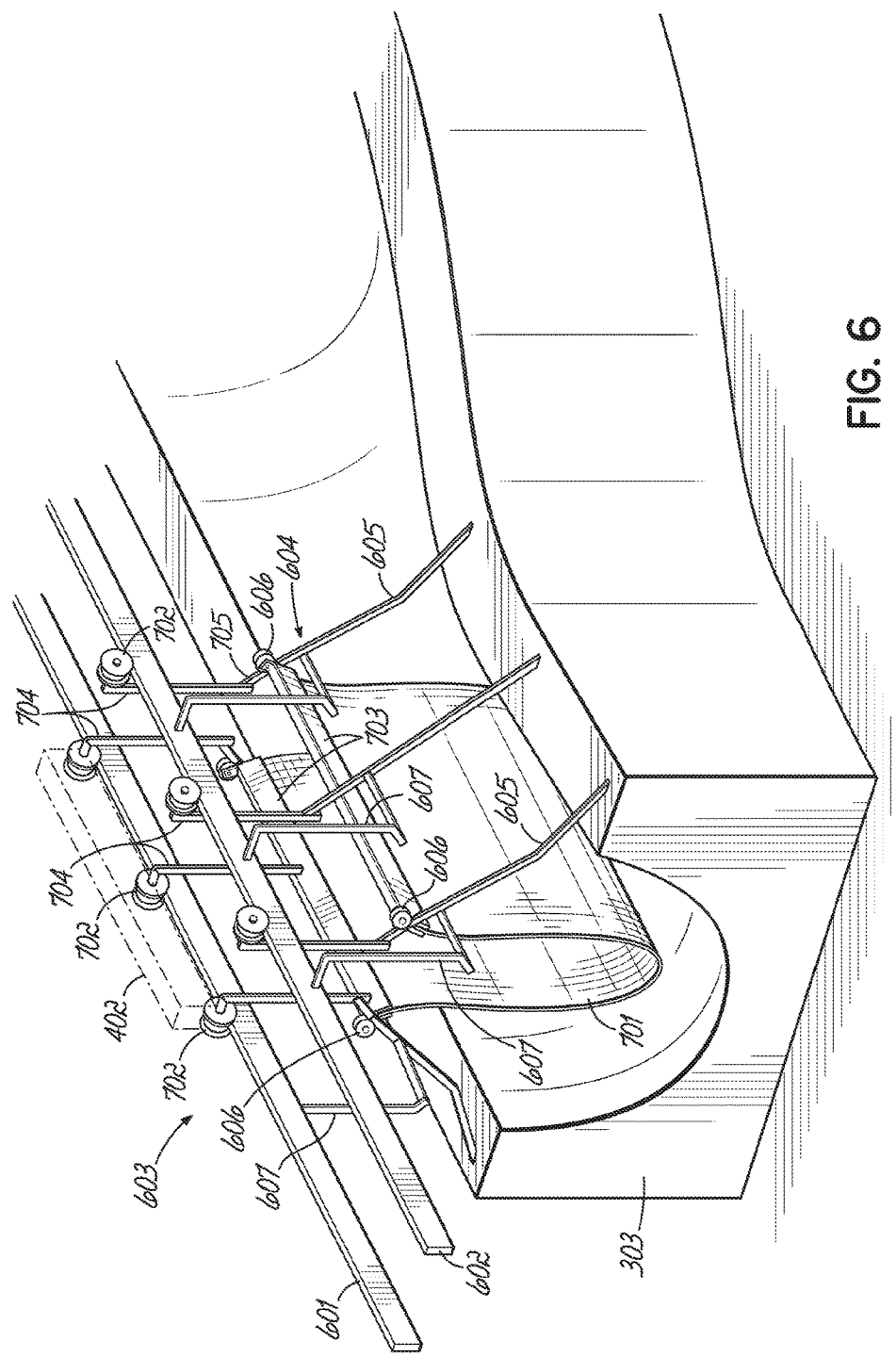
FIG. 6 is a perspective view of a sheet positioning apparatus positioned over a mould and including sheet guiding mechanism.

FIG. 6 shows a further example of the invention that provides a sheet dismounting arrangement for guiding a sheet of material from a position in which it is mounted on the mounting apparatus to a desired position on the mould. First and second rails 601, 602 are mounted proximate to the mould 303 of a wind turbine blade. Both rails follow a path in a direction along the longitudinal length of the mould, which corresponds to the spanwise direction of the finished blade within the mould. In this example, the rails follow a substantially parallel path and are displaced from one another, in use, along the blade chord direction as defined by the mould.

As with the examples of FIGS. 3 to 5, a sheet mounting apparatus 603 is provided, which is coupled to the rail and configured to releasably hold a sheet of material, and to move along the rail. Again, the sheet mounting apparatus 603 may comprises one or more clamps supported from a carriage comprising rollers or runners, to releasably hold the sheets.

The sheet dismounting arrangement comprises a plurality of sheet dismounting assemblies 604 that are located at various positions along the rail. The positions correspond to the positions on the mould at which it is desired to mount a given sheet of material. The dismounting assemblies each include a guide 605 in the form of a rib that defines a path for guiding the sheet from the mounting apparatus to the desired position on the mould for subsequently being fixed thereto. By disconnecting a sheet from the mounting apparatus of the mounting apparatus and coupling it to, or engaging it with, a plurality of the ribs 605 the sheet can be moved easily and accurately into position over the blade mould.

The guides 605 each comprise a rib, or bar, that extends generally from a location near to the rail to a location at or near the mould, the ribs being preferably coupled to the mould. The sheet mounting apparatus has a number of guiding mechanisms 606 in the form of rollers, but they may also be in the form of runners or sliding bodies. The rollers 606 are configured to follow the path provided by the ribs 605 and are coupled to the sheet when being used. The rollers 606 each engage with a rib 605 and follow the path defined by the rib to move the sheet into the desired position. It is possible simply to align the sheet, when mounted on the mounting apparatus, with the desired ribs, detach the sheet from the mounting apparatus and position the rollers 606 on respective ribs to move it into position. However, preferably a mechanism is provided for moving the sheet from the mounting apparatus to the ribs.

Figure 7:
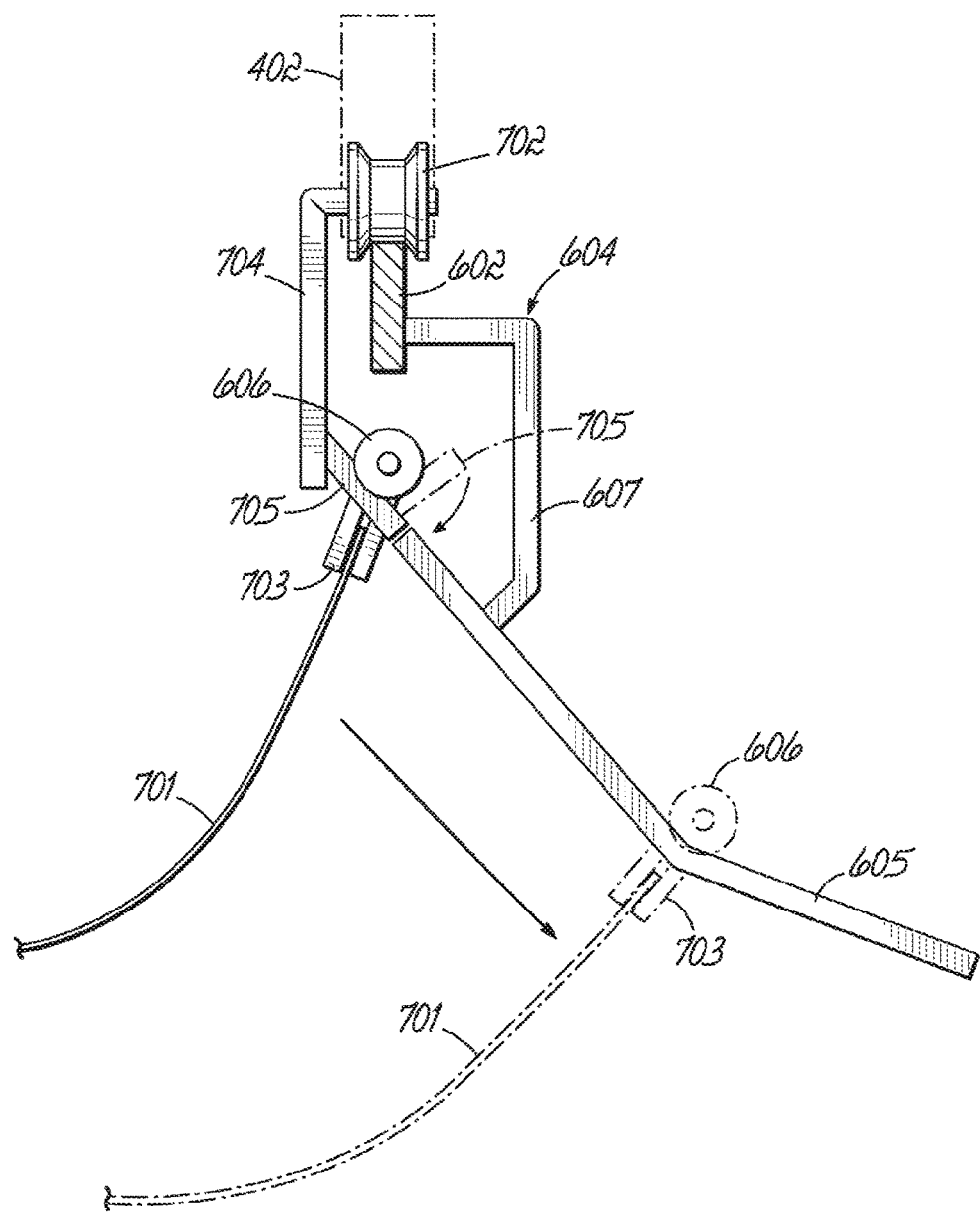
FIG. 7 is a side view of the sheet guiding mechanism and the sheet mounting apparatus of FIG. 6.

FIG. 7 shows a side view of an enlargement of a carriage, mounting apparatus and dismounting assembly according to the example of FIG. 6. FIG. 7 is a side on view of the right hand rail 602 of FIG. 6, showing a roller 702 of a carriage that includes a clamp 703 for holding a sheet 701 at, or along, one edge and a support member 704 coupling the clamp to the roller 702. Also shown is the rib 605 that is used for guiding the sheet 701 from the mounting apparatus to the mould (not shown).

Coupled to the sheet 701, via clamp 703, is guiding mechanism 606 which in this example is in the form of a roller. The roller is shown in the Figure in two different positions. In the first position, indicated by the solid lines, the roller is engaged with a portion of the support member 704. This is the location of the roller when the sheet is held by the mounting apparatus and is being transported along the rail. In the second position, indicated by the dashed lines, the roller is engaged with the rib 605, and is in transit from the rail towards the desired position on the mould. From this it can be seen that FIG. 6 shows the sheet of material when it is coupled to the ribs and is in the process of being dismounted from the mounting apparatus and moved into position on the mould.

In order to get the roller from the first position, engaged with the support member 704, to a second position, engaged with the rib, it is necessary for the path provided by the rib to engage with the support member 704. The rib 605 provides a path for the roller that extends from the mould to a position in the vicinity of the rail, but the path stops short of the rail 602. The rib may be configured such that it is positioned close enough to the rail such that when the support member 704 of a mounting apparatus is aligned with the rib, it forms a substantially continuous path such that the roller is able to move from the support member to the rib and continue along the path to the mould. However, this requires accurate construction and a separate mechanism for holding the roller in place when it is in the first position. It will be understood that there may be a small gap between the rib and the support member and that, provided it is small enough, the roller will still be able to move from the support member to the rib.

As an alternative, a bridging member 705 can be provided, the bridging member being used to bridge a gap between the support member 704 and the rib 605 when they are aligned. Use of such a bridging member 705 avoids the risk of the mounting apparatus colliding with the ribs when they are transporting a sheet 701 along the rail, since it allows for a clearance to be formed between the support member and the ribs which is then bridged by the bridging member. The bridging member can be provided on the support member 704 and moved from a first position, such as the position indicated by the dotted lines referenced by number 705, into a second position as indicated by the arrow in which the roller is able to move from the support member 704 onto the path defined by the rib 605. In the second position the bridging member may connect with both the rib and support member to form a continuous path therebetween, or the bridging member may be connected to only the support member or only the rib, with the possibility of a small gap in the path between the support member and the path of the rib over which the roller 606 may pass.

When in the first position, the roller 606 is preferably held in place by a holding member. Preferably the bridging member 705 is attachable to the support member 704 such that it can be used, when in the first position, as the holding member and prevent the roller from moving. However, it is also possible that the bridging member 705 is instead attached to the rib 605, with a separate holding member or a suitable braking mechanism, used to prevent the roller 606 from moving when it is in the first position on the support member.

Examples of the invention, such as that shown in FIGS. 6 and 7, that use guides such as ribs 606 may use the guides to also support the rails on the mould. This can be seen in FIG. 6 whereby the ends of the ribs sit on the mould, or perhaps on a structure in proximity to the mould. As an example, the ribs may couple to the mould using spigots, whereby a set of spigots, or corresponding sockets, are positioned on the mould to engage with a corresponding socket or spigot of each rib. Other means of coupling the guides to the mould are possible. In addition, each rib includes a coupling member 607 that couples the rib to a rail 602 in order to support it in position above the blade mould 303.

The coupling member 607 may be in the form of a support arm that connects to the rib 605 and to the rail 602. The support arm 607 connects to the rib 605 on one side of the rib, and is offset from the rib in a direction along the path of the rail 602 so as to allow the roller 606 to pass along the path defined by the rib. The roller 606 similarly connects to the clamps in an offset manner, with the support that connects the roller 606 to the clamp 703 passing around the other side of the rib. The side of the rib 605 that the support that connects the roller 606 to the clamp 701 passes, is the opposing side of the rib to that on which the support arm 607 connects. In this manner, the roller 606 is free to pass along the path defined by the rib 605, whilst including a support arm 607 on the other side of the rib to connect the rib 602 to the rail. This arrangement is very similar to that used to couple the support member 704 to the rail 602 without obstructing the roller 702 and can be seen more clearly in FIG. 7, whereby the support member 704 connected to roller 702 is offset on one side of the rail 602, whereas the support arm 607 engages with or couples to the rail on the opposite side.

Whilst the example of FIG. 6 has been shown with two separate rails, the rails may instead be formed together, and have two separate tracks along which the carriage can move. It is possible to implement an example having guides (i.e. the ribs) such as those described in relation to FIG. 6 of FIG. 8 using a single rail. For instance, the examples of FIGS. 3 to 5 could be implemented with a plurality of guides, such as ribs, placed along the blade mould at positions corresponding to the locations at which sheets of material are to be mounted on the mould. When the mounting apparatus is aligned with the ribs the sheet can be detached from the mounting apparatus and engaged with the guides to position it in the desired location. The ribs may, for example, engage with engagement means on the clamps. Where the guides are in the form of ribs or bars, one or both of the clamps may include a number of holes along the length of the clamp that engage with the ribs to allow the clamps, and the sheet held by them, to move along the path defined by the ribs and into the desired position.

Although the examples described above have used one or more rails that extend in a substantially straight line along the longitudinal length of the mould, it is possible for the rails to follow a curved path along at least part of the longitudinal length of the mould. This allows the rails to more closely follow the edges of the mould, reducing the distance between the sheet and the mould once the sheet is in the correct position on the rail.

Figure 9A:
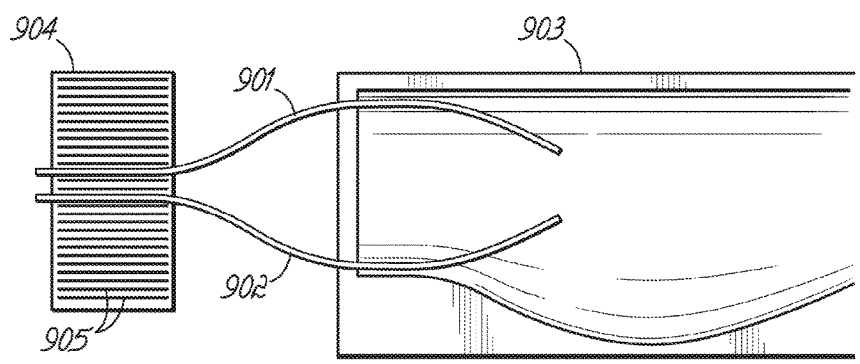
FIG. 9 shows a plan view (FIG. 9a) and perspective view (FIG. 9b) of a further example.
Figure 9B:
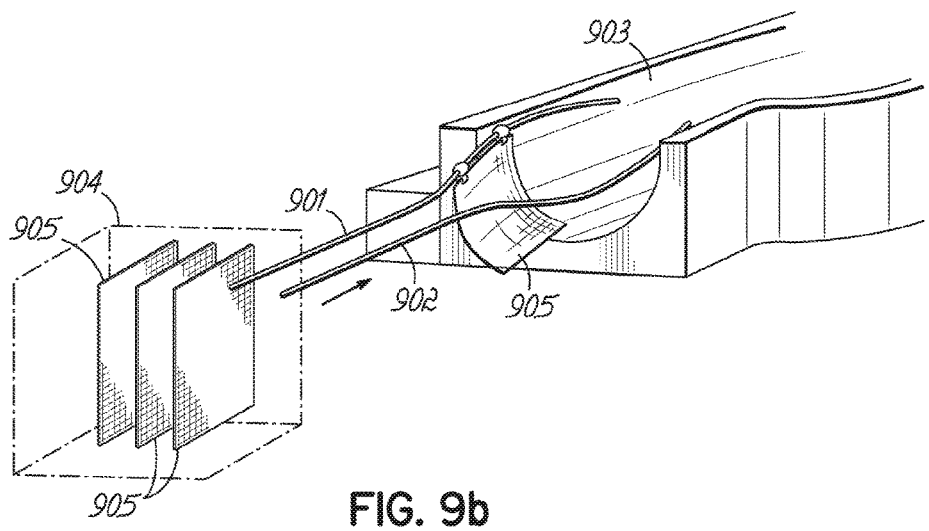

FIGS. 9a and 9b show two different views of such an arrangement, which is intended for use with one or more "half chord" sheets. FIG. 9a shows a plan view, whereas FIG. 9b shows a perspective view.

In the example of FIG. 9, first and second rails 901, 902 are provided that extend over a portion of a blade mould 903. In particular, as with previous examples, the rails may extend over a root portion of the blade mould for transporting sheets to be inserted into the root portion of the blade. The rails may be supported on the mould by supports that are not shown in the figure although the support structure and carriage may be the same as described for other examples such as FIGS. 6, 7 and 8.

The rails 901, 902 both follow, at least along a portion of their length, an edge of the blade mould corresponding to either the leading edge or the trailing edge of the blade. In the example of FIG. 9, the rail 901 is located proximate to the edge of the mould that corresponds to the leading edge of the blade. The rail 901, over a portion of its length, follows a path substantially equidistant from this edge of the mould. This allows the rail to closely follow an edge of the mould in a location of the mould in which sheets of material are to be mounted. Correspondingly, the second rail 902 may follow a path, over a portion of its length, substantially equidistant from the edge of the mould corresponding to the trailing edge of the blade.

The first and second rails 901, 902 can clearly be seen to be separated along the blade chord direction. The separation between the rails varies over their length. In particular, the rails start off at a first location 904, which preferably corresponds to a storage location for a plurality of sheets that are to be mounted on the mould. In this location the rails may be relatively close together, their separation being less than the distance from the leading edge of the mould to the trailing edge in the chordwise direction at the root section. Having the rails located relatively close together allows sheets from a storage area to be coupled to both rails for subsequent transport to the required location on the mould.

As the paths of the rails move towards the blade mould the distance between the rails increases such that, by the point at which the path reaches the blade mould root section, their separation is approximately the same as the distance from the leading edge of the mould to the trailing edge in the chordwise direction at the root section. At this point, each rail is located close to the respective edge of the mould.

As described above, once the rail path reaches the root section of the blade mould it may follow the leading or trailing edge, as appropriate, over a portion of its length. This may correspond substantially to the length of the root section of the blade so that the rail can be used to position sheets of material over substantially the entirety of the blade root section. Once the root section has been passed the rail paths may deviate from following an edge of the mould, such as with the paths moving closer together as shown in FIG. 9.

Preferably, in this example, when a sheet is mounted on a rail it is mounted by one edge and moved along the rail in the same orientation as shown in FIG. 9. Since it is mounted only by one edge, the sheet is effectively hung from the rail. When the sheet reaches the mould it contacts the mould and conforms to the curvature of the mould. This allows the sheet to be positioned in the desired location, and laid in the desired position, before detaching the sheet from the rail and fixing it in place. A sheet 905 is shown in FIG. 9b as an example of this. As can be seen, the sheet is in contact with the mould 903 and is conforming to the curvature of the mould as a result.

Again, as with previous examples more than one sheet can be mounted on a rail at any given time, allowing for a conveyor belt type arrangement whereby a sheet can be loaded onto the rail whilst another sheet is being transported into position or is being fixed to the mould.

Figure 10A:
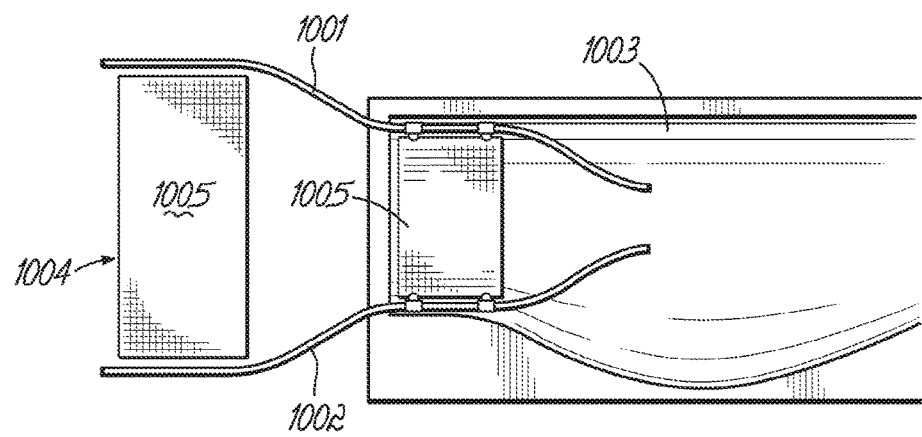
FIG. 10 shows a plan view (FIG. 10a) and perspective view (FIG. 10b) of an additional example.
Figure 10B:
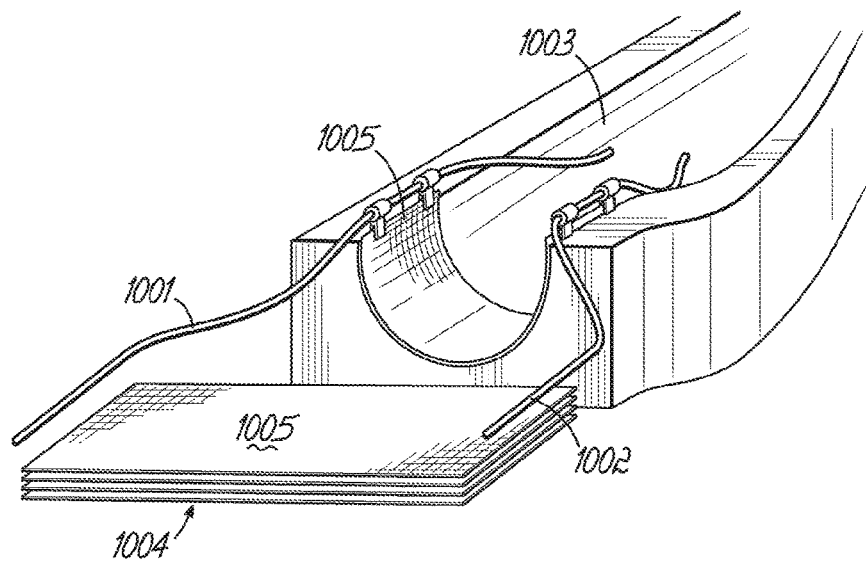

FIGS. 10a and 10b show two different views of an example related to that of FIGS. 9a and 9b, the arrangement being preferably intended for use with one or more "full chord" sheets. FIG. 10a shows a plan view, whereas FIG. 10b shows a perspective view.

The example of FIG. 10 shares similarities with that of FIG. 9. Again, first and second rails 1001, 1002 are provided that extend over a portion of a blade mould 1003. In particular, as with the example of FIG. 9, the rails preferably extend over a root portion of the blade mould for transporting sheets to be inserted into the root portion of the blade. The rails may be supported on the mould by supports that are not shown in the figure, although the support structure and carriage may be the same as described for other examples such as FIGS. 6, 7 and 8.

In the example of FIG. 10 the sheets of material 1005 are coupled at opposing edges to respective rails, by appropriate mounting means, such that each sheet is carried by both rails to the desired location on the mould. In the same manner as the example of FIG. 9, the rails 1001, 1002 both follow, at least along a portion of their length, an edge of the blade mould corresponding to either the leading edge or the trailing edge of the blade.

The first and second rails 1001, 1002 are separated along the blade chord direction. The separation between the rails varies over their length, but may do so in a manner that is different to that of the example described in relation to FIG. 9. The rails may start off at a first location 1004, at which a plurality of sheets are stored. Since the sheets are to be mounted to both rails, they may be provided flat with the length of the sheet lying in a direction substantially perpendicular to the chordwise direction of the mould 1003 in use. The sheets can, in this way, be laid flat on the ground, for example, until they need to be inserted into the mould, at which point they are mounted onto the rails 1001, 1002. To accommodate the sheets and to make mounting onto the rails easier, the separation between the rails at the sheet mounting location 1004 may be approximately or substantially the same as the length of the longest sheet to be mounted. The separation between the rails at this point is therefore greater than the distance from the leading edge of the mould to the trailing edge in the chordwise direction at the root section. The sheets can therefore be stored in a position such that each end of the sheet is proximate to the rail to which that end is to be mounted. The sheets can then be mounted flat before being moved along the rail.

As the paths of the rails move towards the blade mould the distance between them decreases such that, again, by the point at which the paths reach the blade mould root section, the separation between the rails is approximately the same as the distance from the leading edge of the mould to the trailing edge in the chordwise direction at the root section. At this point, each rail is located close to the respective edge of the mould. As with the example of FIG. 9, once the rail path reaches the root section of the blade mould it preferably follows the leading or trailing edge of the mould as appropriate over a portion of its length.

As can be seen in FIG. 10, as the separation between the rails decreases, the slack in a sheet mounted on both rails increases. The slack manifests itself as a curve in the sheet between either end mounted on the rails. The separation between the rails can be made such that the curve in the sheet approximately conforms to the curvature of the mould in the position at which the sheet is to be inserted into the mould. This allows the sheet to be positioned in the desired location more accurately, and gives a better indication of where the sheet should be positioned before detaching the sheet from the rail and fixing it in place. Sheet 1005 shows how a sheet can be taken from a flat orientation and a curve introduced as the sheet approaches the blade mould root section. As can be seen, the curvature of the sheet when positioned at the mould root section approximately conforms to the curvature of the mould as a result.

It is possible to use sheets of materials that have different lengths. For example, sheets positioned at the root may have a sorter length than sheets positioned beyond the root section. As such, shorter length sheets can be coupled to the rails using one or more extension clamps.

Again, as with previous examples more than one sheet can be mounted on both rails at any given time, whereby a sheet can be loaded onto the rails when another sheet is being transported into position or is being fixed to the mould.

The examples described above have been described in relation to providing sheets of materials around the root section of a blade mould. This finds particular use when applying reinforcing material, such as plies of glass fibre material, around the blade root. However, it will be understood that embodiments of the invention could be applied to the provision of stacks or sheets of material to any location along the length of a turbine blade mould.

The description above refers to the transport and positioning of sheets of material. The sheets may be a single ply of material, or may be formed from multiple plies. Specific examples of materials that may make up the sheets of material include plies of fibre reinforced materials, such as glass fibre material, or a stack of plies of glass fibre material. Sheets of FRP may be used, or a number of sheets may be stitched together into a stack of fibre so that all of the sheets of the fibre in the stack can be laid into the mould at the same time, thus reducing the average amount of time taken to lay each individual sheet into the mould. The sheets may be dry fabric or pre-impregnated (prepreg) material Certain examples of the invention have been described in which a sheet is held by the sheet mounting apparatus along only one side of the sheet. In such embodiments, preferably the sheet has a length such that, when laid in the wind turbine blade mould the sheet extends along the mould surface of the blade mould from either the trailing or leading edge to an intermediate point on the mould surface between the trailing and leading edge; this includes a so called "half chord" type sheet. Alternatively, the sheet may have a length such that, when laid at the desired position in the wind turbine blade mould, it extends along the mould surface of the blade mould substantially from the trailing edge to the leading edge, this being a so called "full chord" sheet. It will be apparent that some examples could be used for both "full chord" and "half chord" arrangements.

The invention claimed is:

1. An apparatus for positioning sheets of material in a wind turbine blade mould to form a shell of a wind turbine blade, the mould having a mould surface defining the profile of a portion of the shell, the apparatus comprising:
   at least one rail that, in use, is mounted proximate to the mould and follows a path in a direction along the longitudinal length of the mould;
   at least one sheet of material configured to be positioned in the mould; and
   at least one sheet mounting apparatus coupled to the at least one rail and releasably coupled to the at least one sheet of material, the at least one sheet mounting apparatus configured to move along the at least one rail so as to move the at least one sheet of material along the mould, wherein the at least one sheet mounting apparatus comprises a carriage that engages with the at least one rail to allow the at least one sheet mounting apparatus to move along the at least one rail and first and second clamps connected to the carriage for holding the at least one sheet of material along at least one side, the first and second clamps each being configured to hold the at least one sheet of material at opposing edges, and wherein the location of the first and second clamps is such that the at least one sheet of material, in use, is held in a slack state.

2. The apparatus according to claim 1 wherein the blade shell portion in the mould defines a channel and wherein the at least one rail is mounted such that, in use, the at least one sheet of material held by the at least one sheet mounting apparatus passes at least partially within the channel when moving along the at least one rail.

3. The apparatus according to claim 1 wherein the at least one rail is supported, at least in part, by the wind turbine blade mould.

4. The apparatus according to claim 1 comprising a plurality of sheet mounting apparatus coupled to the at least one rail to allow more than one sheet to be moved along the at least one rail at one time.

5. The apparatus according to claim 1 wherein the mould includes a mould root section corresponding to a root section of the wind turbine blade, the at least one rail, in use, passing over the mould root section.

6. The apparatus according to claim 1, wherein the first and second clamps are suspended from the carriage.

7. The apparatus according to claim 1, wherein the at least one rail includes a first rail and a second rail, the first and second rails, in use, being mounted proximate to the mould and following a path in a direction along the longitudinal length of the mould, and wherein the at least one sheet mounting apparatus includes first and second sheet mounting apparatuses coupled respectively to the first and second rails, the first and second sheet mounting apparatuses each configured to releasably hold a sheet of material and to move along its respective rail.

8. The apparatus according to claim 7 wherein the first and second mounting apparatuses are configured to hold first and second sheets of material respectively, each sheet of material having a length such that, when laid in the wind turbine blade mould the sheet of material extends along the mould surface of the blade mould from either the trailing or leading edge to an intermediate point on the mould surface between the trailing and leading edge.

9. The apparatus according to claim 7 wherein the first and second mounting apparatuses are configured to hold a single sheet or a stack of sheets of material in use, the sheet or stack of sheets of material having a length such that, when laid at the desired position in the wind turbine blade mould, it extends along the mould surface of the blade mould substantially from the trailing edge to the leading edge.

10. The apparatus according to claim 9, wherein a separation along the blade chord direction between the first and second rails in the region of the mould in which the sheet of material is to be placed is such that the sheet of material, in use, is held in a slack state having a curvature corresponding approximately to the curvature of the mould at that location.

11. The apparatus according to claim 7 wherein the first and second rails are separated, in use, along the blade chord direction as defined by the mould.

12. The apparatus according to claim 1 wherein the path followed by the at least one rail begins, in use, at a storage location containing a plurality of sheets of material to be positioned in the shell, where the sheets of material are configured to be attached to the at least one sheet mounting apparatus.

13. An apparatus for positioning sheets of material in a wind turbine blade mould to form a shell of a wind turbine blade, the mould having a mould surface defining the profile of a portion of the shell, the apparatus comprising:
at least one rail that, in use, is mounted proximate to the mould and follows a path in a direction along the longitudinal length of the mould; and
at least one sheet mounting apparatus coupled to the at least one rail, the at least one sheet mounting apparatus configured to releasably hold a sheet of material and to move along the at least one rail, wherein the at least one sheet mounting apparatus comprises a carriage that engages with the at least one rail to allow the at least one sheet mounting apparatus to move along the at least one rail and first and second clamps connected to the carriage for holding the sheet of material along at least one side, the first and second clamps each being configured to hold the sheet of material at opposing ends, and the location of the first and second clamps being such that the sheet of material, in use, is held in a slack state,
wherein the at least one sheet mounting apparatus includes one or more cross bars that are releasably coupled, at or near either end, to the first and second clamps, the apparatus further comprising a releasable restraining mechanism for preventing the first and second clamps from moving relative to the cross bars.

14. An apparatus for positioning sheets of material in a wind turbine blade mould to form a shell of a wind turbine blade, the mould having a mould surface defining the profile of a portion of the shell, the apparatus comprising:
at least one rail that, in use, is mounted proximate to the mould and follows a path in a direction along the longitudinal length of the mould; and
at least one sheet mounting apparatus coupled to the at least one rail, the at least one sheet mounting apparatus configured to releasably hold a sheet of material and to move along the at least one rail,
wherein the at least one rail includes a first rail and a second rail, the first and second rails, in use, being mounted proximate to the mould and following a path in a direction along the longitudinal length of the mould, wherein the at least one sheet mounting apparatus includes a first and a second sheet mounting apparatus coupled respectively to the first and second rails, the first and second sheet mounting apparatuses each configured to releasably hold a sheet of material and to move along its respective rail, wherein the first and second rails are separated, in use, along the blade chord direction as defined by the mould, and wherein the separation varies along the length of the first and second rails.

15. The apparatus according to claim 14 wherein the first rail follows a path, over a portion of its length, substantially equidistant from the leading edge of the blade as defined by the mould, and/or wherein the second rail follows a path, over a portion of its length, substantially equidistant from the trailing edge of the blade as defined by the mould.

16. An apparatus for positioning sheets of material in a wind turbine blade mould to form a shell of a wind turbine blade, the mould having a mould surface defining the profile of a portion of the shell, the apparatus comprising:
at least one rail that, in use, is mounted proximate to the mould and follows a path in a direction along the longitudinal length of the mould;
at least one sheet mounting apparatus coupled to the at least one rail, the at least one sheet mounting apparatus configured to releasably hold a sheet of material and to move along the at least one rail; and
one or more sheet dismounting assemblies located at one or more positions along the at least one rail, the dismounting assemblies each including a guide that defines a path for guiding the sheet of material from the mounting assembly to a desired position on the mould for subsequent attachment thereto.

17. The apparatus according to claim 16 wherein the guide is coupled to the mould.

18. The apparatus according to claim 17 wherein the guide includes a rib that extends from a position proximate to the at least one rail to a position on the mould, wherein, in use, the sheet of material can be decoupled from the at least one sheet mounting apparatus and coupled to one or more ribs.

19. The apparatus according to claim 18 wherein the ribs support the rails on the mould.

20. An apparatus for positioning sheets of material in a wind turbine blade mould to form a shell of a wind turbine blade, the mould having a mould surface defining the profile of a portion of the shell, the apparatus comprising:
first and second rails that, in use, are mounted proximate to the mould and follows a path in a direction along the longitudinal length of the mould; and
first and second sheet mounting apparatus coupled respectively to the first and second rails, the first and second mounting apparatus configured to releasably hold a sheet of material and to move along their respective rails,
wherein the path followed by the first and second rail begins, in use, at a storage location containing a plurality of sheets of material to be positioned in the shell, where the sheets of material are configured to be attached to the first and second sheet mounting apparatus, and wherein a separation along the blade chord direction between the first and second rails at the storage area is approximately the same as the width of a sheet of material to be positioned in the blade shell, the sheets of material being mounted on the first and second sheet mounting apparatus in a flat orientation.

21. The apparatus according to claim 20 wherein the separation between the first and second rails reduces along the path of the rails such that when the sheet of material is in the desired mounting position it is slack and has a curvature approximately following the curvature of the blade shell at the desired mounting position.

* * * * *